United States Patent [19]

Seki et al.

[11] Patent Number: 4,777,551
[45] Date of Patent: Oct. 11, 1988

[54] MAGNETIC HEAD SUPPORTING MECHANISM FOR FLEXIBLE DOUBLE-SIDED MAGNETIC DISKS

[75] Inventors: Gen Seki; Seiichi Hayashi, both of Mito; Haruyuki Kaito, Hitachi; Osamu Isoo, Hitachi; Mitsuo Igari, Hitachi; Masahiko Saitoh, Hitachi; Takao Terayama, Ushiku; Yasuhiro Nemoto, Ibaraki, all of Japan

[73] Assignee: Hitachi, Ltd., Tokyo, Japan

[21] Appl. No.: 886,737

[22] Filed: Jul. 18, 1986

[30] Foreign Application Priority Data

Jul. 24, 1985 [JP] Japan .................................. 60-161909
Sep. 18, 1985 [JP] Japan .................................. 60-204275
Sep. 30, 1985 [JP] Japan .................................. 60-215077

[51] Int. Cl.$^4$ ................................................ G11B 5/48
[52] U.S. Cl. ..................................... 360/104; 360/109; 360/130.3
[58] Field of Search ............ 360/104, 105, 109, 130.3

[56] References Cited

U.S. PATENT DOCUMENTS

| | | | |
|---|---|---|---|
| 4,291,350 | 9/1981 | King et al. | 360/109 X |
| 4,306,260 | 12/1981 | Maeda et al. | 360/104 X |
| 4,327,388 | 4/1982 | Wanek | 360/104 |
| 4,376,294 | 3/1983 | Meier et al. | 360/105 |
| 4,611,257 | 9/1986 | Shiroyama et al. | 360/104 |

FOREIGN PATENT DOCUMENTS

| | | | |
|---|---|---|---|
| 2051457 | 1/1981 | United Kingdom | 360/104 |
| 2176646 | 12/1986 | United Kingdom | 360/104 |

OTHER PUBLICATIONS

IBM/TDB, vol. 22, No. 2, Jul. 1979, pp. 735–736, "Two Sided Flexible Media Head Suspension Improvement" by Bell et al.

Primary Examiner—John H. Wolff
Attorney, Agent, or Firm—Antonelli, Terry & Wands

[57] ABSTRACT

A mechanism for supporting magnetic heads has gimbal plates which support both magnetic heads in such a manner than the magnetic heads oppose to each other across a flexible double-sided magnetic disk. The magnetic heads are resiliently pressed onto the magnetic disk through movable members which are resiliently biased.

6 Claims, 9 Drawing Sheets

MAGNETIC HEAD SUPPORTING MECHANISM FOR FLEXIBLE DOUBLE-SIDED MAGNETIC DISKS

BACKGROUND OF THE INVENTION

1. Field of the Invention:

The present invention relates to a recording and reproducing apparatus for use with a flexible double-sided magnetic disk and, more particularly, to a mechanism for supporting magnetic heads in such an apparatus.

2. Description of the Prior Art:

A typical known mechanism for supporting magnetic heads in a recording and reproducing apparatus for use with a flexible double-sided disk has, as shown in Japanese Patent Laid-Open No. 124910/1976 for example, flexible supporting means for supporting both magnetic heads and resilient means such as leaf springs which resiliently press the magnetic heads onto both surfaces of the magnetic disk. This arrangement is advantageous in that it reduces the tendency for damage and wear of the disk surface due to impact at the time of head loading, and permits the heads to well follow up the undulation of the magnetic disk. On the other hand, this known mechanism requires a long time for the head to be settled in contact with the disk surface after the head loading, as well as for the settling of the head in the seeking operation. This construction employing independent resilient supports for both magnetic heads makes it difficult to keep both magnetic heads in alignment during the assembly.

In order to obviate these problems, Japanese Patent Publication No. 15866/1983 proposes a mechanism in which one of the magnetic heads is fixed. This arrangement cannot overcome the problem of damaging or wear of the disk surface due to impact caused during head loading. In addition, the damage and wear of the disk surface tend to occur even during steady rotation of the disk, because the disk is maintained in tight contact with the fixed magnetic head by the force produced by the other magnetic head. The fixed magnetic head is fixed against the movement in the direction perpendicular to the disk surface. Therefore, various troubles or difficulties are encountered such as offtracking or inferior contact between the head and the disk surface, due to inaccurate positioning of the fixed magnetic head with respect to a reference plane on the apparatus.

SUMMARY OF THE INVENTION

Accordingly, an object of the invention is to provide a magnetic head supporting mechanism which is capable of reducing damage and wear of the magnetic disk and to shorten the time required for the heads to be settled after head loading or seeking, while assuring a high precision of the head assembly, without being accompanied by troubles such a off-tracking and inferior contact due to offset of the magnetic heads in the direction perpendicular to the disk surface.

To this end, according to the invention, there is provided a magnetic head supporting mechanism comprising: a first magnetic head facing one side of a flexible double-sided magnetic disk; a second magnetic head disposed to oppose the first magnetic head and facing the other side of the magnetic disk; a first movable member disposed on the side of the first magnetic head opposite to the magnetic disk and movable up and down with respect to the magnetic disk; a second movable member disposed on the side of the second magnetic head and movable up and down with respect to the magnetic disk; first urging means for urging, through the first movable member, the first magnetic head into contact with the one side of the magnetic disk; a second urging means for urging, through the second movable member, the second magnetic head into contact with the other side of the magnetic disk; and gimbal-type supporting means for supporting the first and second magnetic heads in such a manner as to afford greater angular displacements of the magnetic heads in the pitching direction than in the rolling direction.

The above and other objects, features and advantages of the invention will become clear from the following description of the preferred embodiments.

BRIEF DESCRIPTION OF THE DRAWINGS

FIGS. 1 to 11 show a first embodiment of the invention in which:

DESCRIPTION OF THE PREFERRED EMBODIMENTS

Figure 1:
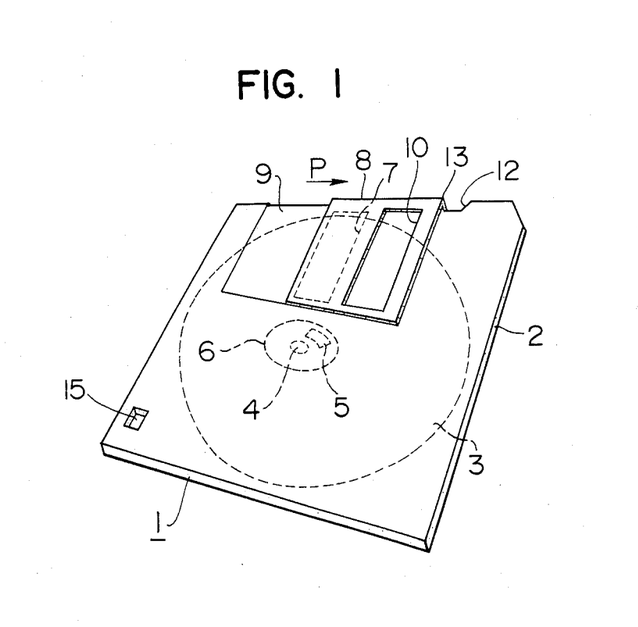
FIGS. 1 and 2 are perspective views of a magnetic disk cassette.
Figure 2:
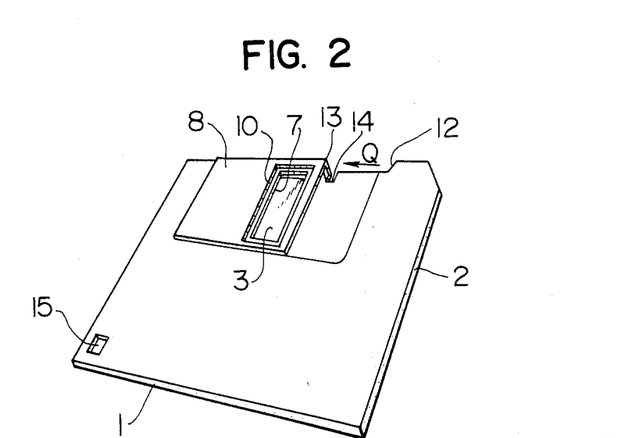

Referring to FIGS. 1 and 2, a magnetic disk cassette 1 has a cassette case 2 made of a plastic, and a flexible double-sided magnetic disk (referred to as "magnetic disk" hereinafter) 3 which is encased by the cassette case 2. The magnetic disk 3 is provided with a central hub 6 which has a central shaft hole 4 and a driving pin hole 5. Windows 7 are formed in both walls of the cassette case 2 so as to make the magnetic head 3 accessible. A shutter 8 is slidably mounted on a stepped mounting portion 9 provided on the cassette case 2. The shutter is biased by a spring in the cassette case 2 in the direction of an arrow P so as to normally close the windows 7.

The shutter 8 has apertures 10 of a size somewhat greater than that of the windows 7. The arrangement is such that, when a force is applied to the end 13 of the shutter 8 in the direction of an arrow Q in FIG. 2, the shutter 8 slides in the direction of the arrow Q, so that the apertures 10 are aligned with the window 7, thus making both surfaces of the magnetic disk 3 accessible. The opening and closing of the shutter 8 is effected by a mechanism which is adapted to be selectively brought into contact with the end 13 of the shutter 8. The movement of this mechanism is guided by a tapered surface 12 formed in one edge of the cassette case 2. The cassette case 2 is further provided with a stopper guide groove 14 and a light-protecting opening 15.

Referring now to FIGS. 3 to 6, the magnetic disk drive has a chassis 16 which has a mounting wall 17a for mounting a stepping motor 17, a side wall continuous from the mounting wall 17a, a side wall 17a extending over the entire length of the edge opposite to the wall 17b, a rear wall 17d and a bottom wall 17e. Thus, the chassis 16 as a whole has a box-like construction opened at its front side as at 18. The open front side of the chassis 16 is covered by a front panel 19 which is made of a plastic.

A pair of metallic guide shafts 20, 20a are laid on the portion of the bottom wall 17e of the chassis 16 adjacent the rear wall 17d. The metallic guide shafts 20, 20a slidably carry a magnetic head assembly which will be mentioned later. The guide shafts 20, 20a are fixed at their one ends to a mounting seat 23 on the bottom wall 17e of the chassis 16 by means of a metallic retainer plate 21 which in turn is fixed by a retainer screw 22. The other ends of these guide shafts are fixed to a mounting seat 26 provided on the bottom wall 17e of the chassis 16 by a metallic retainer plate 24 which in turn is fixed by a retainer screw 25.

A photosensor 28 constituted by a photo-interrupter is secured by a screw 29 to a mounting seat 27 which is disposed at the inner side of the rear wall 17d. An aperture 30 for wiring is formed in the bottom wall 17e. A disk drive motor 31 serving as the driving power source for the magnetic disk 3 has a mounting step 31 which fits in a mounting hole 32 formed in the bottom wall 17e of the chassis 16. The motor 31 has a motor shaft 33 which extends through the hole 32 so as to project above the bottom wall 17e of the chassis 16. The motor shaft 33 is provided with a hub receiver 35 which has a drive pin 34. A cam groove 17f is formed in the portion of the bottom wall 17e of the chassis 16 adjacent the front side 18 thereof, while two roller grooves 17g are formed in the side walls 17b and 17c of the chassis 16.

A plurality of seats 36, 37 for supporting the magnetic disk cassette 1 are formed on the bottom wall 17e of the chassis 16. A metallic eject lever 38 is disposed on the bottom wall 17e of the chassis 16. The eject lever 38 is slidable from the front portion 18 of the chassis 16 towards and away from the rear wall 17d. The eject lever 38 is bent into a form like L as at 39 and is provided with a button mounting tongue 40 to which is secured an eject button 41. The eject lever 38 has integral side walls 42 and 43 which extend in parallel with the side walls 17b and 17c of the chassis 16.

The eject lever 38 is provided at its portion confronting the cam groove 17f in the chassis 16 with a cam mounting portion 44 to which an oil damper 45 is fixed by a damper screw 46. The oil damper 45 has a damper shaft 45a projecting downward therefrom and carrying a damper cam 47 made of a plastic. The cam shaft 48 of the damper cam 47 slidably fits in the cam groove 17f formed in the chassis 16, as will be seen from FIG. 4.

The bottom portion of the eject lever 38 is provided with a hole 50 for cleaning a pin 49 provided on the bottom of the chassis 16 and a tab 51. An eject spring 52 is stretched between the pin 49 and the tab 51 so as to normally bias the eject lever 38 forwardly from the front portion 18 of the chassis 16.

The side walls 42, 43 of the eject lever 38 are provided with inclined grooves 55 which confront the roller grooves 17g formed in the side walls 17b, 17c of the chassis 16. Each of the inclined groove 55 has an upper inclined guide 53 and a lower inclined guide 54. The lower inclined guide 54 is connected to a horizontal roller sheet 54a, while the upper inclined guide 53 is connected to a roller receiving portion 53a. Unlocking portions 56 constituted by an upright protrusions are formed on the side walls 42, 43 of the eject lever 38 on the extensions of the roller seats 54a. Locking steps 57 are formed integrally with the side walls 42, 43 of the eject lever 38.

A metallic holder 58 for accommodating the magnetic disk cassette 1 is disposed in the space between both side walls 42, 43 of the eject lever 38. The holder 58 has a      -shaped cross-section constituted by a top panel 59, lower panels 60 and both side panels 61 which in cooperation define a cassette chamber 62. The top panel 59 and the lower panels 60 are bent upward and downward at their ends adjacent the entrance of the cassette chamber 62, thus forming guide tabs 63 and 64 for the magnetic disk cassette 1.

Guide rollers 65 made of a plastic are provided on both side panels 61 of the holder 58. These guide rollers 65 loosely engage with the roller grooves 17f in the chassis 16 and the inclined grooves 55 in the eject lever 38. A head opening 66 is formed in the top panel 59 of the holder 58 so as to permit a magnetic head to pass therethrough into and out of the holder. The edges of the head opening are machined so as to be able to serve as guide rails for later-mentioned magnetic head.

A cassette controller 67 for the magnetic disk cassette is mounted on the upper surface of the holder 58. The cassette controller 67 includes a shutter lever 68 for selectively opening the shutter 8, a lock lever 69 engageable with the locking steps 57 formed on both side walls 42, 43 of the eject lever 38, and a stop lever 70 which engages with the unlocking portions 56 provided on the side walls 42, 43 of the eject lever 38. The shutter lever 68 has a shutter pressing portion 71 for opening and closing the shutter 8, a guide stopper 72 for detecting erroneous operation, a stopper 73 for the lock lever 69, and a spring retainer 74. The shutter lever 68 is swingably attached to the top panel 59 of the holder 58 by means of a shaft 75. The shutter pressing portion 71 and the guide stopper 72 project into the cassette chamber 62. The lock lever 69 has an actuating member 76 for engagement with the stopper 73, a lock claw 77 for engagement with the locking step 57 of the eject lever 38, and a spring retainer 79. The lock lever 69 is swingably attached to the top panel 59 of the holder 58 through a shaft 80, such that it cooperates with the top panel 59 of the holder 58 in clamping the shutter lever 63 therebetween. A coiled spring 81 for urging the shutter has one end retained by a portion of the lock lever 69 adjacent the shaft 80 and the other end retained by the spring retainer 74 of the shutter lever 68, so that the shutter lever 68 is normally biased counterclockwise as viewed from the upper side in FIGS. 3 and 5.

The stop lever 70 has an actuator arm 82, a stopper 83 for the lock lever 69, and a locking coiled spring 84 having ends retained by the stopper 83 and the spring retainer 79 on the lock lever 69, and is rotatably secured to the top panel 59 of the holder 58 through a shaft 85. The coiled spring 84 is intended for smoothing the engagement between the stopper member 78 and the stopper 83, and has a function for urging the stop lever clockwise as viewed from the upper side in FIG. 5.

Figure 7:
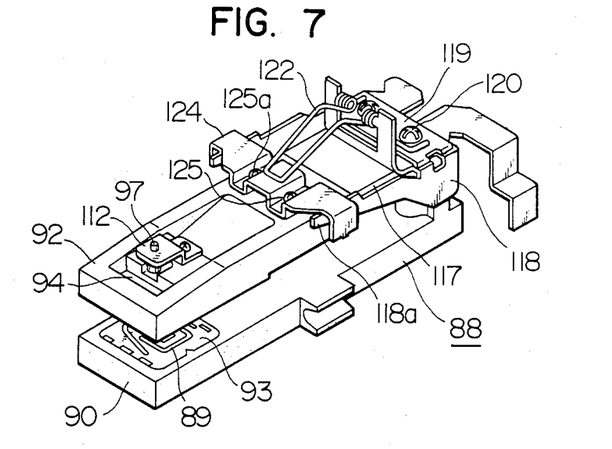
FIG. 7 is a perspective view of a magnetic head assembly.

The rotation of the stepping motor 17 is transmitted to the magnetic head assembly through a screw shaft 86 and a connector 87. Namely, the rotation of the motor shaft of the stepping motor 17 causes the magnetic head assembly 88 to slide along the guide shafts 20, 20a. The magnetic head assembly has the following parts: a first magnetic head 89; a carriage 90 made of, for example, a plastic, and carrying the first magnetic head 89; a second magnetic head 91 disposed to oppose the first magnetic head 89; a head supporting mechanism 92 made of, for example, a plastic and carrying the second magnetic head 91; a first metallic gimbal plate 93 through which the first magnetic head 89 is secured to the carriage 90; a second metallic gimbal plate 94 through which the second magnetic head 91 is secured to the head supporting mechanism 92; a first movable member 95 contacting the rear surface of the first gimbal plate 93, i.e., the surface of the gimbal plate 93 opposite to the first magnetic head 89, and movable in the direction substantially perpendicula to the magnetic disk 3, i.e., up and down direction as viewed in FIG. 8; a first urging means 96 for urging the first movable member towards the magnetic disk 3; a second movable member contacting the rear surface of the second gimbal plate 94, i.e., the surface opposite to the second magnetic head 91, and movable in the direction substantially perpendicular to the magnetic disk 3, i.e., in the up and down directions as viewed in FIG. 8; a second urging means 98 for urging the second movable member 95 towards the magnetic disk 3; a limiting member 99 for limiting the direction of movement of the first movable member 95 only to the direction substantially perpendicular to the plane of the magnetic disk; a small supporting plate 100 for securing the limiting member 99 and the first urging means 96 to the limiting member 99; a limiting member 101 for limiting the direction of movement of the second movable member 97 only to the direction substantially perpendicular to the plane of the magnetic disk 3; and a small supporting plate for securing the second movable member 97 and the second urging means 98 to the limiting member 101. The limiting member 99 is fixed to the small supporting member 100 by means of a screw 113, while the small supporting plate 112 is fixed by means of a screw 114.

Figure 8:
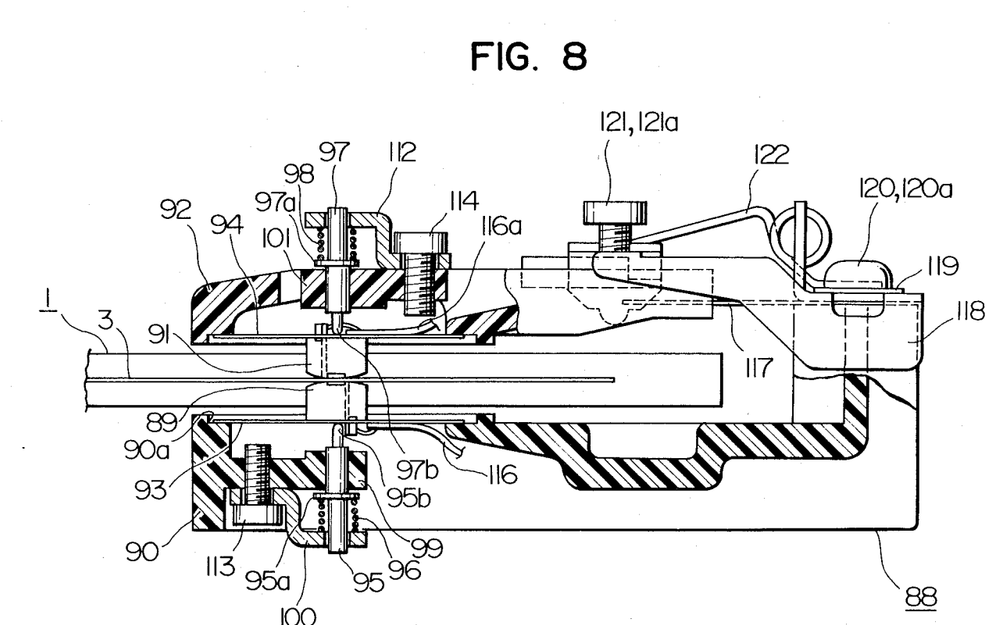
FIGS. 8 and 9 are sectional views of essential portions of the magnetic head assembly.

In the illustrated embodiment, the portions 95b, 97b of the first and second movable members 95 and 97 contacting the gimbal plates 93 and 94 have arcuate forms. This, however, is not exclusive and a satisfactory result is obtainable provided that at least one of these portions has an arcuate form.

Both the first and second urging means 96 and 98 are constituted by coiled springs and are adapted to act on collars 95a and 97a on both movable members 95 and 97, thus ensuring substantially equal head contact pressure to be exerted on both sides of the magnetic disk 3.

Flexible web-like conductors 116, 116a are used to provide connection between a control substrate 115 and both magnetic heads 89, 91.

The head supporting mechanism 92 is pivotally secured to the carriage 90 by means of a head arm spring 117, stopper member 118, washer 119, and fixing screws 120, 120a. The arrangement is such that, as the head supporting mechanism 92 is moved towards the magnetic disk 3, the mechanism 92 is stopped by the stopper member 118 which prevents further movement of the mechanism towards the magnetic disk 3. In this state, the pressure of contact between the stopper member 118 and the head supporting mechanism 92 is adjustable by adjusting the screws 121, 121a so as to vary the pressing force of the spring 122.

Figure 10:
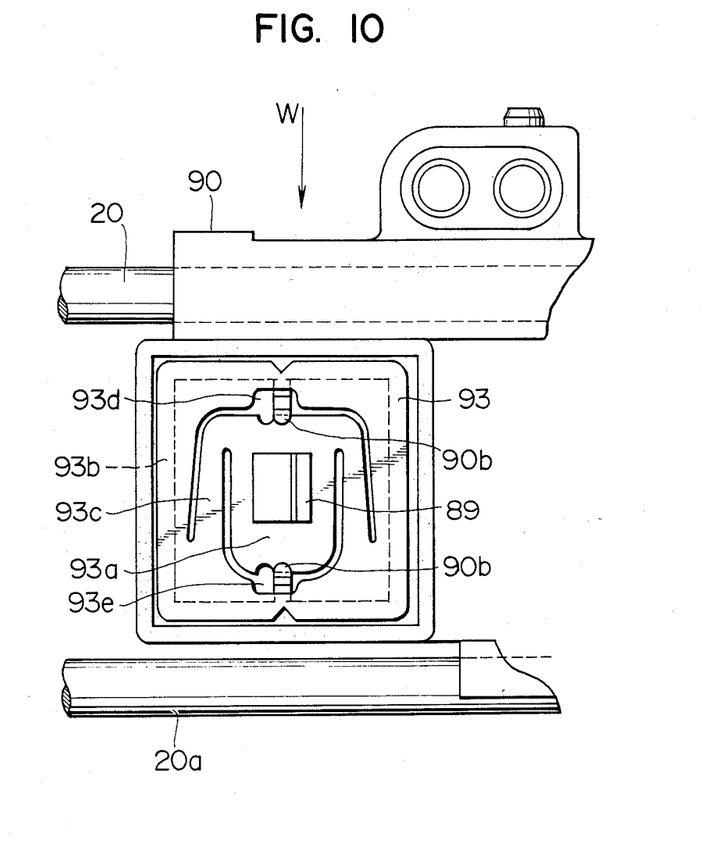
FIG. 10 is an enlarged plan view of an essential portion of the magnetic head assembly.
Figure 11:
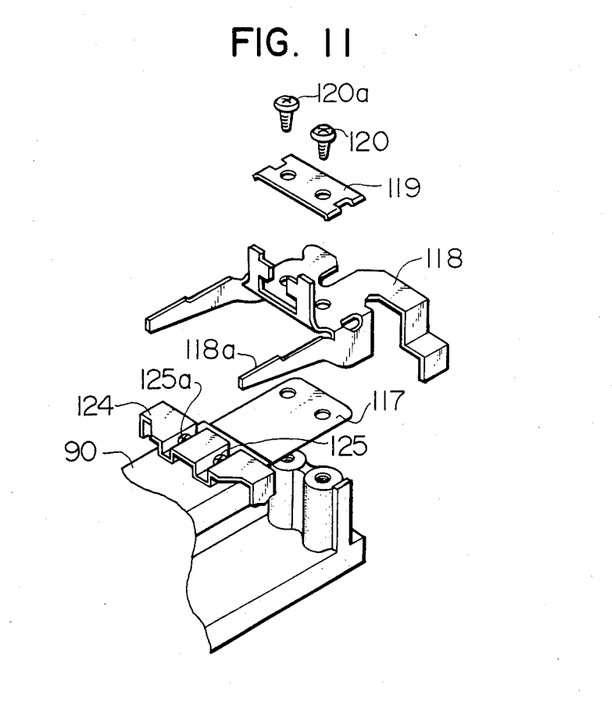
FIG. 11 is a perspective view of an essential portion of the magnetic head assembly.

Since the first and the second gimbal plate 93 and 94 have an identical shape, an explanation will be given as to the shape of the first gimbal plate by way of example, with specific reference to FIG. 10.

The first gimbal plate 93 has a head center support 93a for supporting the first magnetic head 89, a peripheral fixing portion 93b adapted to be fixed to the carriage 90 by, for example, an adhesive, a connecting portion 93c through which the head center support 93a is connected to the peripheral fixing portion 93b, and notches 93d, 93e which define the connecting portion 93c. The gimbal plate 93 is so designed that it affords a greater amount of angular displacement in the pitching direction than in the rolling direction. The term "pitching direction" is used to mean the direction of rotation of the disk 3 perpendicular to the radius of the disk 3, whereas the term "rolling direction" is used to mean the direction perpendicular to the pitching direction.

Figure 9:
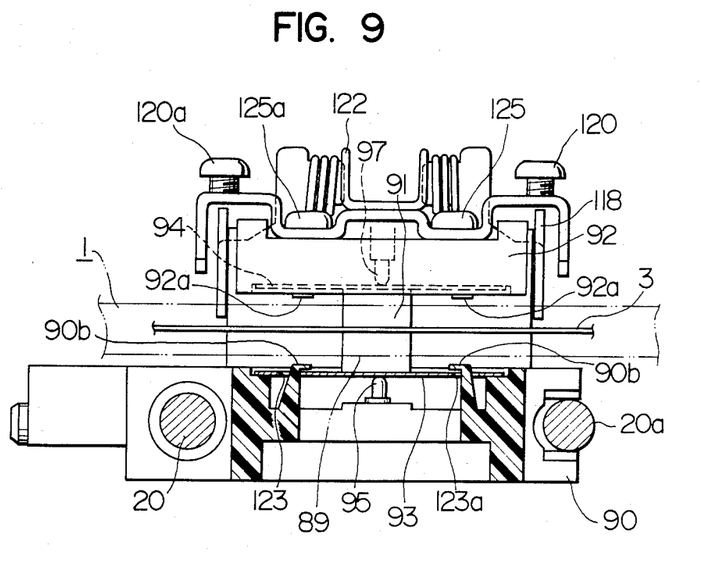

As will be seen from FIG. 9, the carriage 90 is provided with a deformation preventing means 90b which prevents any deformation of the first gimbal plate 93 due to an excessive movement thereof. Similarly, the head supporting mechanism 92 is provided with a deformation preventing means 92a which prevents deformation of the second gimbal plate 92a due to excessive movement thereof. Both deformation preventing means 90b, 92a are so designed that gaps 123, 123a are preserved between the gimbal plates and the deformation preventing means 90b, 92a, through the notches 93d, 93e.

In the described embodiment, the abutment between the head supporting mechanism 92 and the stopper member 118 actually takes place between an engaging portion 118a of the stopper member 118 and an engaging member 124 which is formed as a member separate from the head supporting mechanism. The engaging member 124 is a metallic member and is fixed to the head supporting mechanism by means of screws 125 and 125a.

The operation of the described embodiment will be explained hereinunder.

Figure 3:
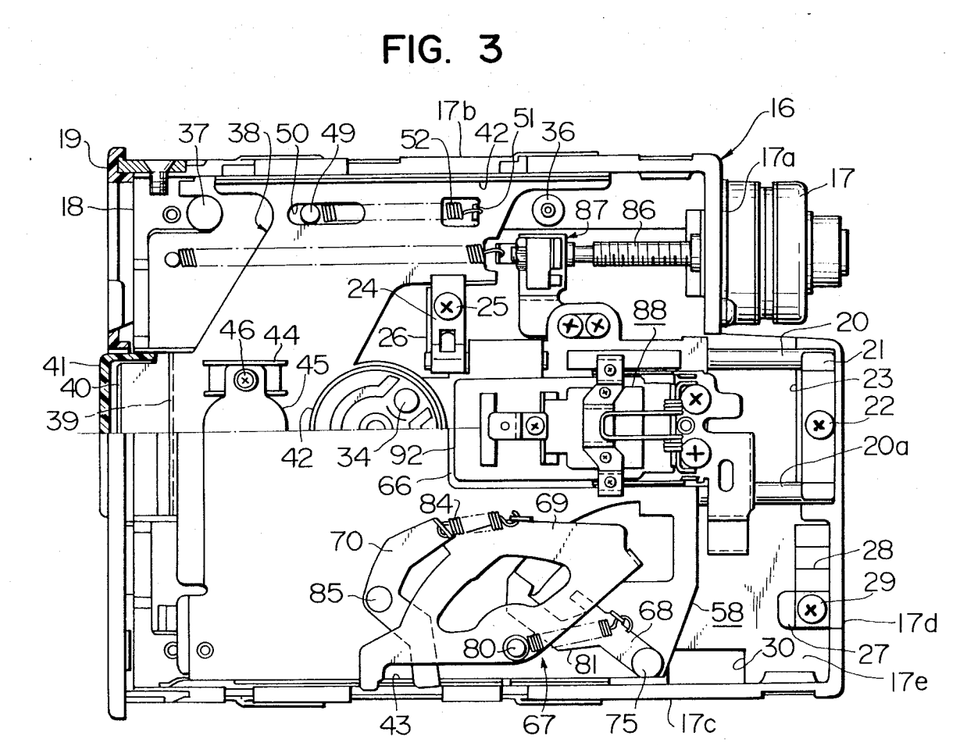
FIG. 3 is a partly-sectioned plan view of a magnetic disk drive.
Figure 4:
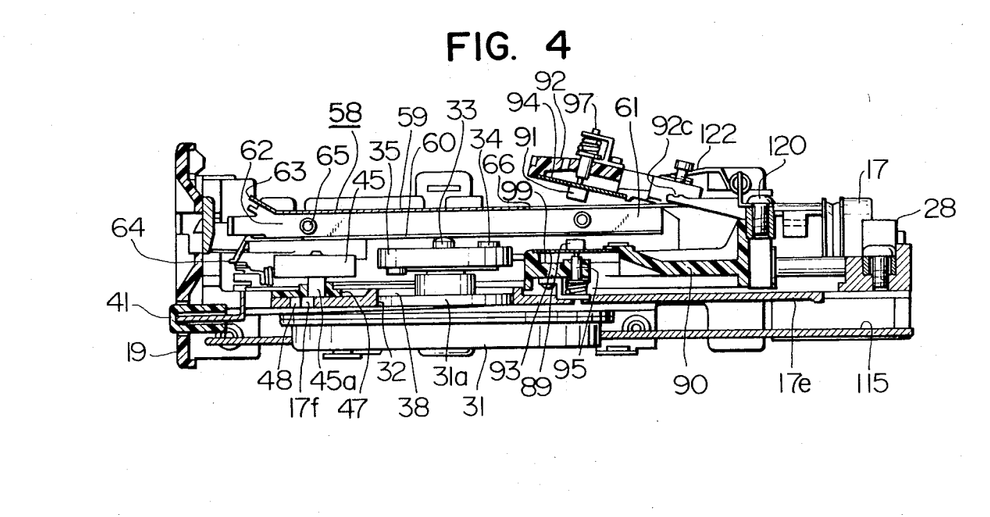
FIG. 4 is a sectional view of an essential portion of the magnetic disk drive.

FIGS. 3 and 4 show the apparatus in a state after ejection of the disk cassette 1, i.e., in an inoperative state. The eject lever 38 is in the depressed position so that the guide rollers 65 provided on the holder 58 are seated on the roller seats 54a of the eject lever 38, so that the holder 58 is stationed at the elevated position. In this state, the head rails of the holder 58 contact the supporting point 92c of the head supporting mechanism 92, so that the head supporting mechanism 92 is born by the top panel 59 of the holder 58 with the head arm spring 117 flexed in a manner shown in FIG. 4. As the disk cassette 1 is inserted, the shutter pressing portion 71 of the shutter lever 68 is moved along the shutter lever guide groove 68a of the cassette 1, with the result that the shutter pressing portion 71 contacts the end 13 of the shutter 8. A further insertion of the cassette 1 causes the shutter lever 68 to rotate clockwise by the inserting force, against the force of the shutter spring 81, so that the shutter 8 is gradually opened by the shutter pressing portion 71. As the cassette 1 is inserted deeper, the end of the cassette 1 comes into contact with the actuator lever 76 of the lock lever 69, so that the actuator lever 76 is urged by the insertion of the cassette 1, whereby the lock lever 69 starts to rotate clockwise against the force of the lock spring 84. As the cassette 1 is inserted further, the operation lever 76 is moved into the space which is defined by a C-shaped portion on the shutter lever 68 and the projection 73.

Figure 5:
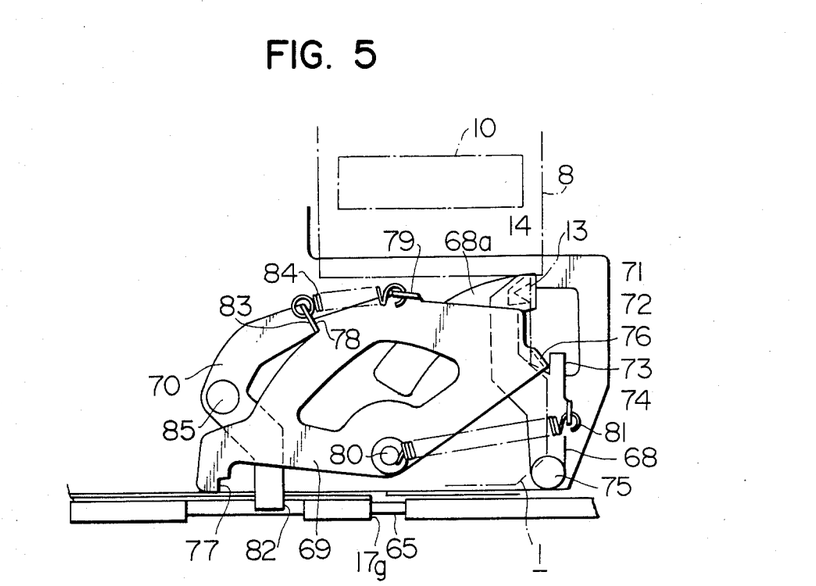
FIGS. 5 and 6 are a plan view and a side elevational view of an eject mechanism for ejecting the disk cassette.

Meanwhile, the rotation of the lock lever 69 causes the return stopper 78 to be moved clockwise into alignment with the stopper portion 83 of the stopper lever 70. Since the stopper lever 70 is biased by the lock spring 84, the stopper portion 83 is brought into engagement with the return stopper 78. On the other hand, the lock claw 80 formed on the lock lever 69 is rotated clockwise so that it is disengaged from the locking step 57 of the eject lever 38. In this state, the shutter lever 68 has already opened the shutter 8 so that the shutter aperture 10 is aligned with the window 7 of the cassette 1 on each side of the magnetic disk 3, so that the magnetic surfaces of the disk 3 are exposed through the windows 7.

Figure 6:
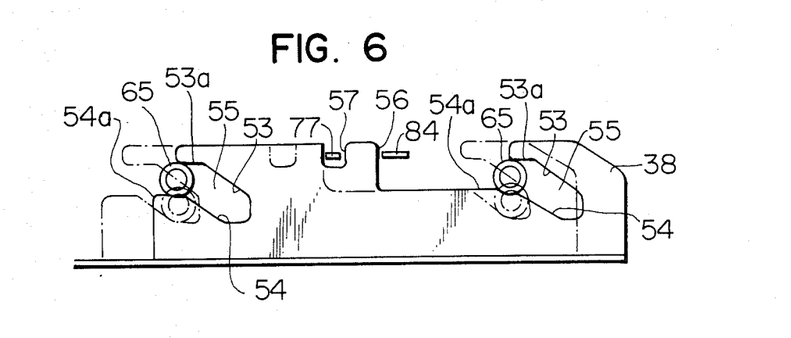

As soon as the lock claw of the lock lever 69 is disengaged from the locking step 57 of the eject lever 38, the eject lever 38 is moved to the left as shown by one-dot-and-dash line in FIG. 6, by the action of the eject spring 52, so that the eject button 41 is projected forwardly. Therefore, the guide rollers 65 secured to the holder 58 roll along the inclined grooves 55 formed in the eject lever 38 downwardly while being guided by the roller grooves 17g formed in the chassis 16. Consequently, the cassette 1 in the cassette holder 58 also is moved downward so that the lower side of the cassette case 2 of the cassette 1 comes to rest on the cassette seats 36, 37 on the chassis. Simultaneously, the hub 6 of the magnetic disk 3 is contacted by the hub receiving surface 35 of the disk drive motor 31, so that the hub shaft 33 and the drive pin 34 are received in the shaft hole 14 and the pin hole 5, respectively, thereby enabling driving of the magnetic disk 3. The head rails are moved downward as a result of the downward movement of the holder 58, so that the supporting point 92c of the head supporting mechanism 92 is freed, with a result that the head supporting mechanism 92 is moved downward by the action of the pressing spring 122, thus allowing the second magnetic head 91 to contact the recording surface of the magnetic disk 3 through the window 7. As the magnetic disk 3 is pressed by the force of the second magnetic head 91, the first head 89 also is made to contact with the magnetic disk 3 stably.

The recording or reproducing operation is then commenced as the stepping motor 17 is started.

After the recording or reproducing operation, the cassette is ejected in the following procedure.

The ejection of the cassette is initiated by depression of the eject button 41. As the eject button 41 is depressed, the guide rollers 65 are raised by the lower inclined guides 54 in the eject lever 38, so that the cassette 1 also is raised by the lower panel 60 of the holder 58. At the same time, the unlocking portion 56 of the eject lever 38 approaches the actuator arm 82 of the stop lever 70. Meanwhile, the lock lever 69 is kept stationary because the return stopper 78 is held in engagement with the stopper 83 of the stop lever 70. Therefore, the lock lever stopper of the projection 73 on the shutter lever 68 is contacted by the actuator lever 76 of the lock lever 69, so that the shutter lever 68 is stationed so as to keep the shutter 18 open.

As the eject lever 38 is further depressed, the guide rollers 65 are rolled onto the roller seats 54a, thus completing upward movement of the holder 58 and the cassette 1. A further depression of the eject lever 38 causes the unlocking steps 56 of the eject lever 38 to be contacted by the actuator arm 82 of the stop lever 70. In consequence, a force is applied to the stop lever 70 so as to rotate the stop lever 70 to be rotated counterclockwise against the force of the lock spring 84. As a result of the rotation, the stopper portion 83 comes off the return stopper 78 so that the lock lever 69 is rotated counter-clockwise by the force of the locking spring 84, whereby the lock claw 77 is brought into engagement with the locking step 57 of the eject lever 38. Simultaneously, the actuator lever 76 of the lock lever 69 is disengaged from the lever stopper 68 of the shutter lever 68, so that the latter is rotated counterclockwise by the force of the shutter spring 81, thereby ejecting the cassette 1 and closing the shutter 8.

Referring now to FIG. 8, the first magnetic head 89 and the second magnetic head 91 are held at positions where the first and the second movable members 95 and 97 urged by the urging means 96 and 98 are stopped by limiting members 99 and 101 at a contact pressure of 10 to 20 gr. The movable members 95 and 97 are held for slight rotation about portions 95b, 97b thereof contacted by the gimbal plates 93, 94. As the cassette 1 is ejected in this state to move the disk 3 out of contact with the first magnetic head 89, both movable members 95 and 97 are moved by the force of the urging means 96, 98 until their collars 95a, 97a are brought into contact with the end surfaces of the limiting members 99, 101. It will be seen that the first and the second limiting members 99, 101 are never moved beyond predetermined positions, despite the urging forces of the urging means 96, 98. In other words, gaps 123, 123a always exist whenever the first and the second magnetic heads 89 and 91 are pressed by each other with the magnetic disk 3 interposed therebetween.

On the other hand, as explained before, the head supporting mechanism 92 is located in the heightwise direction with respect to the disk 3 by the engaging portion 118a extending from the stopper member 118 and the push spring 122. The heightwise position can be adjusted finely by adjusting screws 121, 121a provided on the engaging member 124. It is, therefore, possible to maintain a constant size of the gaps 123, 123a which permit the movement of the movable members 95, 97, thus eliminating any variation in the amount of pressing attributable to the difference in the stroke. Although the described embodiment utilizes coiled springs as the urging means 96, 98, this is not exclusive and the urging means may be constituted by other suitable resilient members such as leaf springs. As will be seen also from FIG. 9, the mechanism in accordance with the invention has deformation preventing means 90b and 92a which serve also as means for holding the first and the second magnetic heads 89 and 91 leaving predetermined gaps 123 and 123a, so that any extraordinary movement of the first and the second magnetic heads 89 and 91 due to, for example, sticking to the surface of the disk 3 can be avoided.

In the described embodiment, the first and the second magnetic heads 89 and 91 are held resiliently so that any impact on the disk surface during head loading can be reduced. The head loading operation is conducted by the vertical movement of the top panel 59 of the holder 58. The vertical movement of the top panel 59 is converted into horizontal movement of the eject lever 38. Any vibration caused during head loading is transmitted through the eject lever 38 to the oil damper 45 and is effectively absorbed by the latter.

The described embodiment enables a reduction of the force applied to the magnetic disk to about one fifth (1/5) and the settling time to about half (½) those of the known arrangement in which one of the magnetic heads is pressed through the magnetic disk to the other magnetic head which is fixed. In addition, both magnetic heads can well follow up undulation of the magnetic disk, so that the head supporting mechanism of the described embodiment is superior also in the aspect of the allowable penetration. Furthermore, the movement of the magnetic heads in the rolling direction in which the off-track tends to occur can be diminished so as to suppress the off-tracking tendency attributable to an offset of both magnetic heads from each other.

Although the described embodiment employs an oil damper, the provision of the oil damper is not essential. Namely, the oil damper can be dispensed with, provided that the values of the spring constants of the first and the second urging means are suitably selected. It is to be understood also that the shape of the gimbal plate explained in connection with FIG. 10 is only illustrative and a substantially equivalent effect is obtainable with any shape of gimbal plate having one degree of freedom in the pitching direction.

Figure 12:
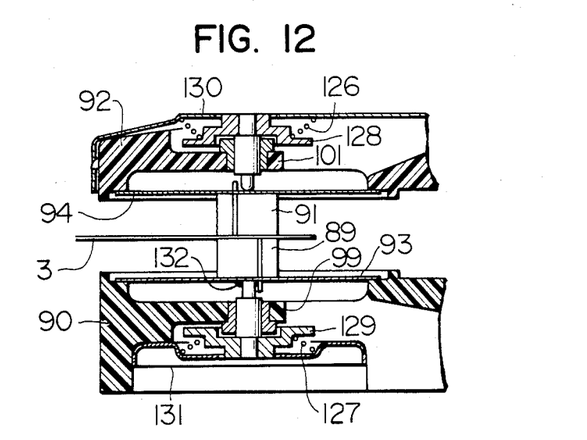
FIG. 12 is an enlarged sectional view of an essential portion of a second embodiment.
Figure 13:
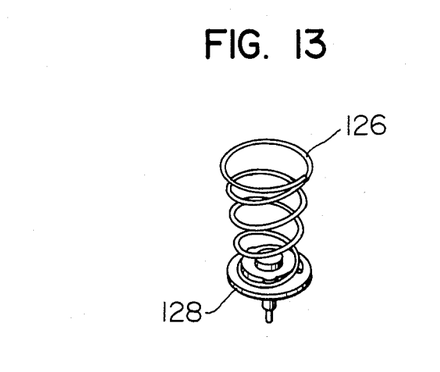
FIG. 13 is an enlarged perspective view of an essential portion of the embodiment shown in FIG. 12.
Figure 14:
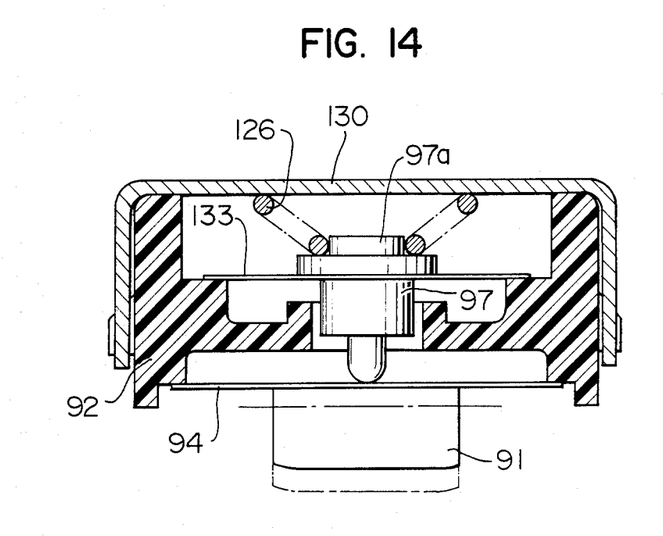
FIG. 14 is an enlarged sectional view of an essential portion of still another embodiment.

FIGS. 12 to 14 show different embodiments of the invention. In these Figures, the same reference numerals are used to denote the same parts or members as those appearing in FIGS. 1 to 11.

In the embodiment shown in FIGS. 12 and 13, the second magnetic head 91 is urged onto the magnetic disk 3 by the force of a conical coiled spring 126 through a second movable member 128, while the first magnetic head 89 is pressed onto the magnetic disk 3 by the force of a conical coiled spring 127 through a first movable member 129. The conical coiled springs 126 and 127 are mounted on the head supporting mechanism 92 and the carriage 90, respectively, by means of magnetically shielding plates 130 and 131. The first movable member 129 and the second movable member 128 have an identical form. The first gimbal plate 93 and the first movable member 129 are bonded to each other by an adhesive 132 at their contacting regions.

In the embodiment shown in FIG. 14, the second movable member 97 is supported by a resilient plate 133.

What is claimed is:

1. A magnetic head supporting mechanism comprising: a first magnetic head facing one side of a flexible double-sided magnetic disk which is adapted to rotate; a second magnetic head disposed to oppose said first magnetic head and facing the other side of said magnetic disk; a first movable member disposed on a side of said first magnetic head opposite to a side of said first magnetic head facing said magnetic disk and restrained to normal movement or up and down with respect to said one side of said magnetic disk; a second movable member disposed on a side of said second magnetic head opposite to a side of said second magnetic head facing said other side of said magnetic disc and restrained to normal movement or up and down with respect to said magnetic disk; first urging means for urging, via said first movable member, said first magnetic head into contact with said one side of said magnetic disk; a second urging means for urging, via said second movable member, said second magnetic head into contact with said other side of said magnetic disk, and gimbal-type supporting means for supporting said first and second magnetic heads in such a manner as to afford greater angular displacement of said magnetic heads in the pitching direction than in the rolling direction vis-a-vis said magnetic disk when in its operational state; each of said first and second urging means comprising a spring and collar for resiliently biasing said first and second movable members, respectively; and limiting members for restraining lateral excursion and up and down travel of each of said movable members and for enabling each said movable member to move exclusively in a direction substantially perpendicular to a plane defined by the sides of said magnetic disk so that controlled orthogonal contact between said opposed heads and said magnetic disk is ensured.

2. A magnetic head supporting mechanism according to claim 1, wherein said first and second urging means enable substantial equal contact pressure between said first magnetic head and said magnetic disk and between said second magnetic head and said magnetic disk.

3. A magnetic head supporting mechanism according to claim 1, wherein said springs of said first urging means and said second urging means are coiled springs.

4. A magnetic head supporting mechanism according to claim 1, further comprising: a carriage movable in the seeking direction and carrying said first magnetic head, said first gimbal plate, said first movable member and said first urging means; and a head supporting mechanism mounted on said carriage and supporting said second magnetic head, said second gimbal plate, said second movable member and said second urging means.

5. A magnetic head supporting mechanism according to claim 4, wherein said carriage carries a stopper member which bears the weight of said head supporting mechanism at least during reproducing and recording.

6. A magnetic head supporting mechanism according to claim 1, wherein said first and second movable members are non-resilient elongated members.

* * * * *